United States Patent [19]

Triplett

[11] 4,058,229
[45] Nov. 15, 1977

[54] LIFTING MECHANISM FOR TRUCKS

[76] Inventor: James Thomas Triplett, P.O. Box 488, Chester, S.C. 29706

[21] Appl. No.: 637,457

[22] Filed: Dec. 3, 1975

[51] Int. Cl.² .............................................. B60P 1/48
[52] U.S. Cl. .................................... 214/77 R; 212/9; 214/300
[58] Field of Search .................. 214/77 R, 300, 315, 214/130 R, 75 H; 212/8 R, 9

[56] References Cited

U.S. PATENT DOCUMENTS

| 1,189,526 | 7/1916 | Bailey | 212/9 |
| 2,567,178 | 9/1951 | Bird | 214/77 R |
| 2,662,654 | 12/1953 | Eakin | 214/77 R |
| 3,074,573 | 1/1963 | Cole | 214/315 |
| 3,124,265 | 3/1964 | Bertels | 214/300 |
| 3,276,610 | 10/1966 | Thatcher | 214/77 R |
| 3,768,671 | 10/1973 | La Vier | 214/77 R |
| 3,780,877 | 12/1973 | Levitt | 214/77 R |

FOREIGN PATENT DOCUMENTS

| 1,885,412 | 9/1963 | Germany | 214/300 |
| 203,873 | 12/1967 | U.S.S.R. | 214/77 R |

Primary Examiner—Albert J. Makay
Assistant Examiner—Ross Weaver
Attorney, Agent, or Firm—Bailey, Dority & Flint

[57] ABSTRACT

A lifting device for use on pickup trucks and the like for loading and unloading objects carried on a load support to and from the truck bed. The lifting device includes a pair of laterally spaced booms having lower ends pivotally supported on a frame. Elongated lifting arms are pivotally attached to the other ends of the booms and are, in turn, pivotally attached to the load platform. Abutment means are provided for engaging the elongated lifting arms as the booms are rotated over the bed of the truck for shortening the radius of the arcuate path of travel of the load support as the load is loaded into the truck bed.

7 Claims, 4 Drawing Figures

LIFTING MECHANISM FOR TRUCKS

BACKGROUND OF THE INVENTION

The present invention relates to a lifting device and more particularly to a lifting device which is adapted to load and unload loads from a truck utilizing a minimum of the length of a truck bed.

Lifting devices for trucks such as pickup trucks are well known and one particular device is disclosed in U.S. Pat. No. 3,276,610 granted on Oct. 4, 1966 to C. R. Thatcher. In this device booms are carried on the rear of a pickup truck for lifting loads into and from the pickup truck. One problem with such devices is that the load travels along the same arcuate path as it is lifted from the ground onto the truck. In some particular cases this presents a problem in that the bed of the truck has to be of sufficient length so that the load does not strike the rear portion of the cab of the truck as such is being deposited therein.

In U.S. Pat. No. 3,170,580 granted on Feb. 23, 1965 to V. G. Soyko such would not be the problem since the boom is telescoping. By varying the length of the boom as the load is placed into the truck such would enable the arcuate path that the load travels as it is being placed in the truck to be varied.

Other standard loading devices for trucks are illustrated in U.S. Pat. No. 2,848,123 granted on Aug. 19, 1958 to C. R. Keyes and U.S. Pat. No. 2,099,998 granted to R. H. Byrd granted on Nov. 23, 1937.

SUMMARY OF THE INVENTION

The invention includes a lifting device for use on pickup trucks and the like for loading and unloading objects carried on a load support to and from the bed of the truck. The lifting device includes a frame member which is adapted to be supported on the bed of the truck. A pair of laterally spaced booms are pivotally supported adjacent their lower ends on the frame members. Elongated lifting arms are, in turn, pivotally connected to the remote ends of the spaced booms. Normally, the load support is pivotally connected to the free end of the lifting arms. Power means are provided for rotating the laterally spaced booms for lifting the load support from the ground onto the bed of the truck. The booms have abutments provided thereon for engaging the elongated lifting arms as the booms are rotated over the bed of the truck for shortening the radius of the arcuate path of travel of the load support as the load is loaded onto the truck bed. This enables containers such as illustrated in FIG. 3, to be loaded onto the bed of pickup trucks having a relatively short length.

A locking device can be provided for securing the boom to a container in order to turn the container upside down to dump the contents therefrom.

Accordingly, it is an important object of the present invention to provide a lifting device for trucks and the like wherein the path of travel of loads can be varied so as to shorten the horizontal distance between a loading and unloading point.

Still another important object of the present invention is to provide a lifting device that is adapted to be utilized in pickup trucks for loading objects such as containers onto relatively short bed pickup trucks.

Still another important object of the present invention is to provide a relatively simple lifting device which can be readily installed on the bed of pickup trucks and the like.

These and other objects and advantages of the invention will become apparent upon reference to the following specification, attendant claims, and drawings.

DESCRIPTION OF A PREFERRED EMBODIMENT

Figure 1:
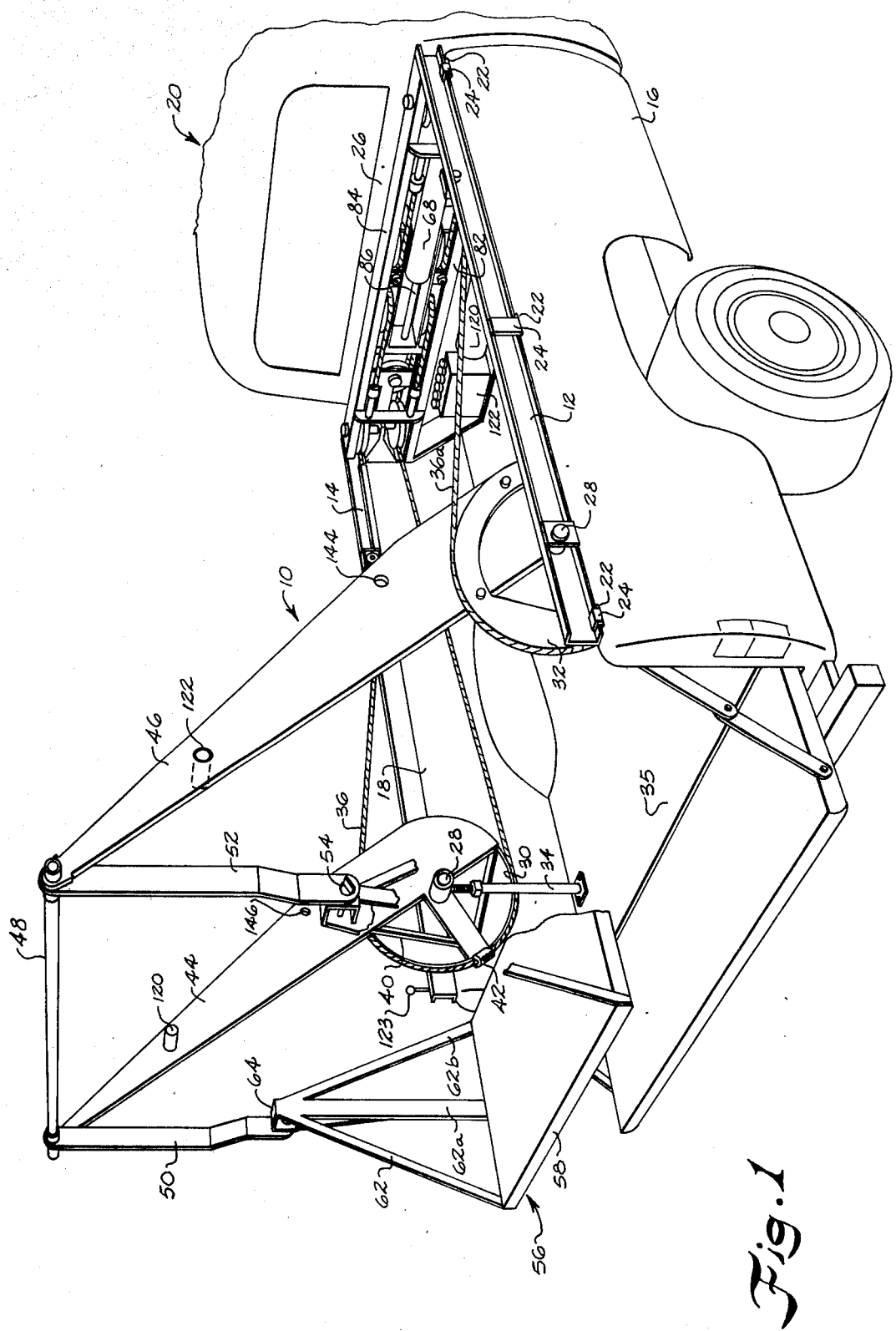
FIG. 1 is perspective view with parts broken away for purposes of clarity illustrating a lifting device constructed in accordance with the present invention mounted on the frame of a pickup truck.

Referring in more detail to FIG. 1 of the drawings, there is illustrated a lifting device generally designated by the reference character 10 constructed in accordance with the present invention. The lifting device includes a pair of spaced, horizontal C-shaped channel members 12 and 14 which rest on the side walls 16 and 18 of a pickup truck generally designated by the reference character 20. The side walls 16 and 18 normally have holes 22 provided therein. The frame members 12 and 14 are provided with vertically extending braces 24 which slide within the holes 22 for securing the channel members 12 and 14 onto the walls of the truck. Another channel member 26 is welded to the inner ends of the members 12 and 14 to provide a U-shaped frame. Extending inwardly from the frame members 12 and 14 adjacent the rear of the truck are a pair of horizontal posts 28 upon which enlarged circular pulley wheels 30 and 32 are journaled. Vertically adjustable braces 34 extend from the bed 35 of the truck to the posts 28 for adding additional support thereto.

The pulley wheels 30 and 32 are identical and have a circumferential groove provided therein for accommodating cables 36 and 36a. Suitable cross-bracing, such as illustrated at 40, is provided in the pulley wheels 30 and 32 for adding strength thereto. It is noted that the cables 36 and 36a are fixed to the circumference of the pulley wheels 30 and 32 by means of a clamp 42.

Outwardly extending booms 44 and 46 have their lower ends welded to the side walls of the pulley wheels 30 and 32 so that as the pulley wheels 30 and 32 are rotated the booms 40 and 46 are pivoted therewith. A horizontal bar 48 extends between the outer ends of the booms 44 and 46. Journaled on the bar 48 are ends of downwardly extending lifting arms 50 and 52. The free ends of the lifting arms 50 and 52 have a bore extending therethrough through which a threaded screw 54 extends for securing a load support generally designated by the reference character 56 to the free ends thereof. The connection between the load support and the free end of the load arms 50 and 52 is a pivotal connection so that as the booms 46 and 50 are raised the load platform remains in a horizontal plane at all times.

The load platform illustrated in FIG. 1, includes a base 58 having braces 62, 62a and 62b extending upwardly therefrom. Such is shown in more detail in FIG. 4. The center brace 62a extends upwardly beyond where angle braces 62 and 62b join it and terminates in a box-shaped member 64. It is noted that a side brace 66 extends upwardly from the junction of the three braces to form one side of the box-shaped member 64. The box-shaped member has threaded holes extending therethrough for receiving the threaded screw 54 so as to permit the lower ends of the lifting arms 50 and 52 to pivot thereon.

Figure 2:
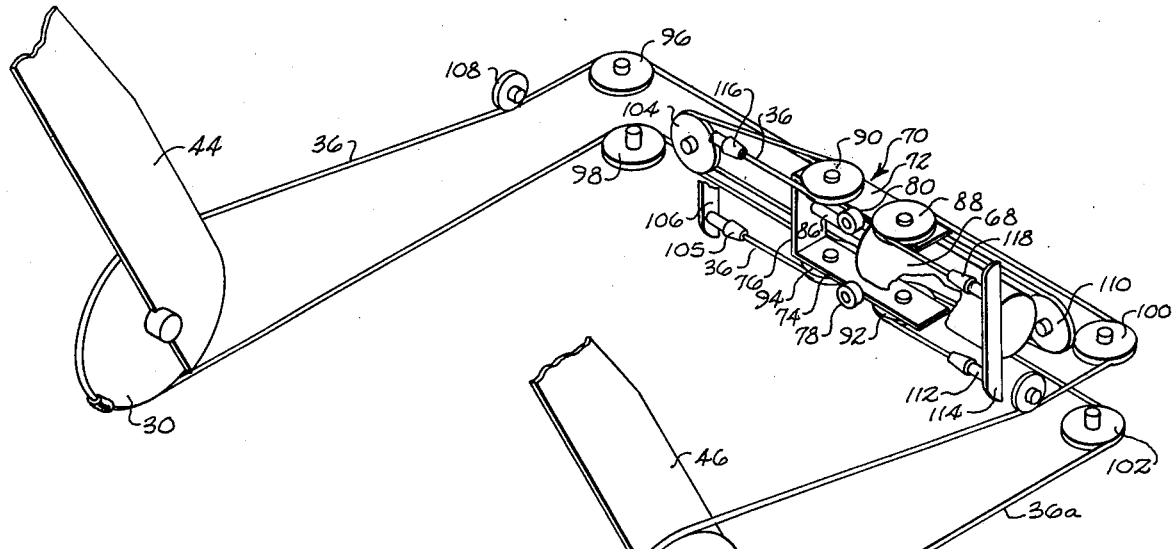
FIG. 2 is an enlarged perspective view with parts broken away for purposes of clarity illustrating a power mechanism for rotating the booms of the lifting device.

The hydraulically operated power means which is best shown in FIG. 2 is provided for pivoting the spaced booms 44 and 46 from a horizontal position wherein the upper ends of the booms rest within the bed of the truck closely adjacent the cab thereof. When the booms are rotated in the opposite direction the free ends thereof may be lowered adjacent the ground for lifting objects therefrom.

The power mechanism includes a hydraulic cylinder 68 which is suitably secured to framing attached to the truck and the side frames 14 and 12. This framing is not illustrated in detail for purposes of clarity. Carried within this framing is a U-shaped movable member 70 defined by upper horizontal member 72 and lower horizontal member 74 joined by a vertical end plate 76. It is noted that the upper and lower frame members 72 and 74 have wheels 78 and 80 mounted thereon so that such can ride freely on flanges of "C" channel frame members 82 and 84. The cable 36 is wrapped around a pulley arrangement so that as the piston rod 86 which extends within the hydraulic cylinder 68 is extended and retracted a two-to-one action will occur between the takeup of the cable 36 and the piston 86. For example, for every inch of movement of the piston 86 there will be two inches of movement of the cable 36. This is caused by the arrangement of pulleys carried on the U-shaped member 70.

As can be seen on the upper plate 72 of the U-shaped member 70 there are a pair of spaced pulleys 88 and 90. Similar pulleys 92 and 94 are provided on the lower horizontal member 74. Pulleys 96 and 98 are journaled within the corners of the front of the truck bed. Similar pulleys 100 and 102 are journaled on the other side of the truck. Tracking the cable 36 it will be noted that the inner end 105 is anchored to a brace 106 suitably secured to the frame so as not to move. The cable 36 extends around pulley 94, pulley 98, enlarged pulley wheel 30, around a guide pulley 108, pulley, 96, pulley 110 which is allowed to rotate about a fixed axis, pulley 92 and has its other end fixed at 112 to brace 114 which is also fixed to the frame members. The boom 46 is pivoted through a second cable 36a which has its inner end 116 anchored to brace 106 and extends around pulley 90, pulley 104, pulley 102, enlarged pulley wheel 32, around pulley 100, pulley 88 has its other end fixed through a coupling 118 to the brace 114.

The hydraulic cylinder 68 is operated by a hydraulic motor 120 that is, in turn, powered by a 12 volt battery 122. The hydraulic cylinder is a double-acting cylinder which moves the U-shaped frame 70 horizontally to the left and right by manipulating lever 123 for raising and lowering the booms 44 and 46. Only the pulley wheels 88, 90, 92 and 94 move since they are carried on the U-shaped frame 70. The remaining pulley wheels disclosed merely rotate about their axis and are fixed in position about their axis.

Figure 5:
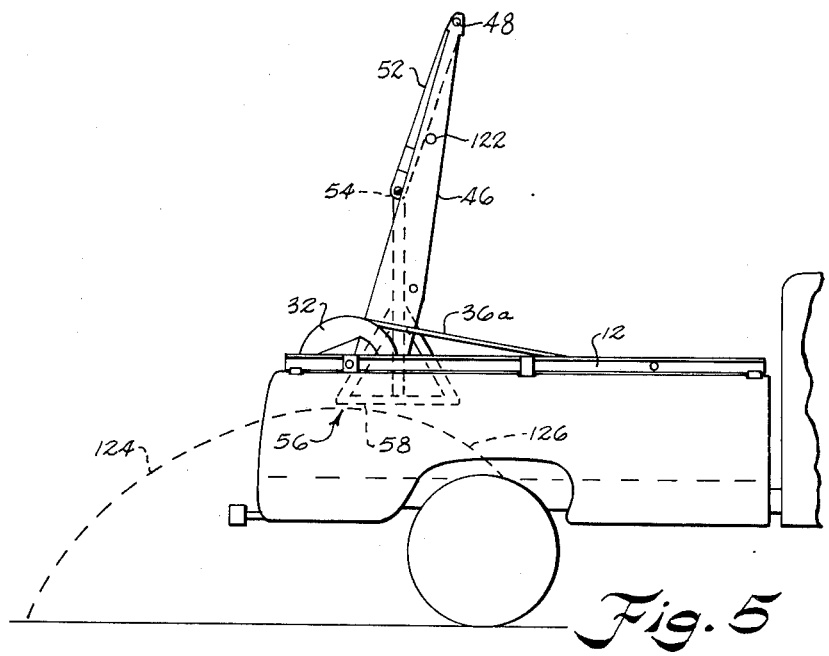
FIGS. 5 and 6 are side elevational views illustrating the path traveled by the boom and load support as the load support is placed within a pickup truck.
Figure 6:
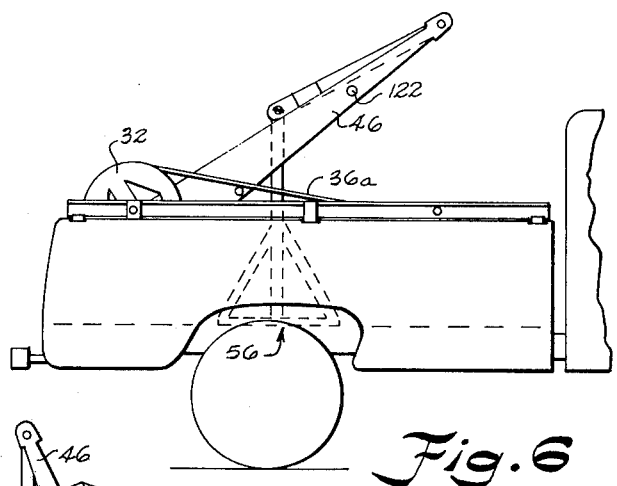

Referring in more detail to FIGS. 5 and 6 of the drawings it can be seen that the booms 44 and 46 have abutment means in the form of horizontally extending rods 120 and 122 provided thereon. The purpose of these rods is to shorten the radius of the arcuate path traveled by the platform 58 as it is raised into the truck. This enables the boom to lift objects of substantial length without the objects striking the cab of the truck. The length of the objects for this purpose is measured parallel to the length of the truck. As can be seen in FIG. 5 the base 58 of the platform as it leaves the ground travels along the path indicated approximately by the dotted line 124. When the boom 46 passes slightly over the vertical the abutment 122 engages lifting arm 52 causing the load platform to swing about pivot point 54. This, in turn, causes the path being traveled by the load to then follow the dotted line as shown at 126. Thereby, as shown in FIG. 6, the platform 56 is deposited substantially in the center of the truck rather than striking the cab or being deposited at the front end of the truck.

Figure 3:
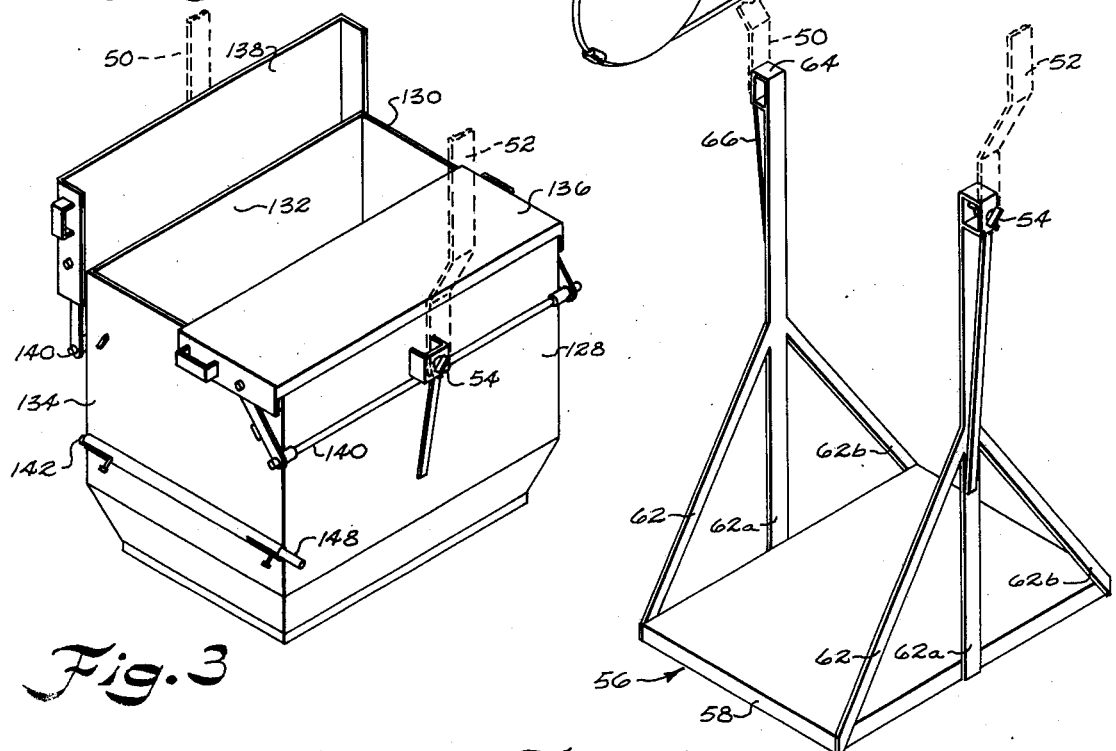
FIG. 3 is a perspective view illustrating one type of container that can be lifted by the lifting device.
Figure 4:
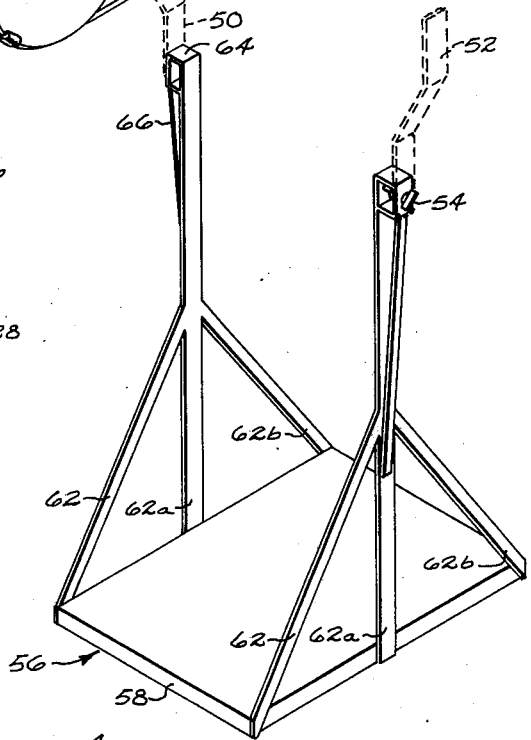
FIG. 4 illustrates another type of load support adapted to be utilized with the lifting device constructed in accordance with the present invention.

The lifting mechanism constructed in accordance with the present invention may be utilized for lifting many type devices and the platform shown in FIGS. 1, 4 and 5 is merely one example. This platform of course, would be good for loading items such as refrigerators and the like from platforms to the truck and from the truck back on the ground or onto other platforms. The lifting mechanism could also be utilized with containers such as illustrated by the trash container in FIG. 3. The container shown in FIG. 3 consists of four side walls 128, 130, 132 and 134 which are joined by a bottom. Hinged tops 136 and 138 provide access to the container. It is noted that the tops 136 and 138 pivot about rods 140 and 142 carried on the side walls of the container. The lifting arms 50 and 52 may be pivotally attached to the container through threaded pins 54 in the same manner as they were attached to the platform illustrated in FIG. 1. The container is also provided with slideable rods 140 and 142 which may be moved from a position where they are inside of the side walls 128 and 130 to an extended position wherein they protrude beyond the side walls 128 and 132. The purpose of these sliding rods 140 and 142 is to secure the container to the booms when it is desired to dump the container.

Figure 7:
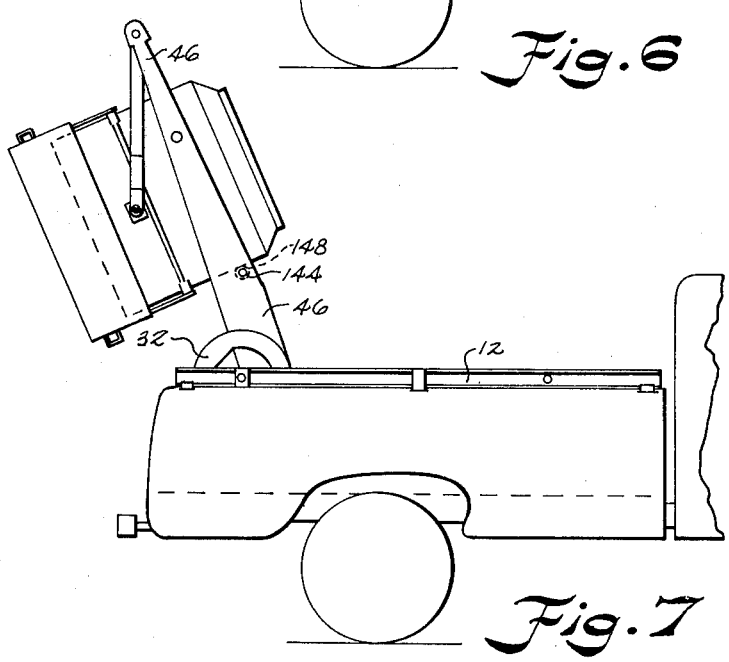
FIG. 7 is a side elevational view illustrating the loading device dumping the container.

As can be seen in FIG. 7 the container is being dumped after it has been lifted into the truck and transported to a dumping station. The container was initially loaded in the truck in the same manner as described in connection with the platform shown in FIGS. 5 and 6. After the container is positioned on the bed of the truck, the locking pins 140 and 142 are extended and protrude through holes 144 and 146 provided in the booms 46 and 50. After the locking pins are in position the booms 44 and 46 are raised and pivoted in a counter-clockwise direction as seen in FIG. 7. Since the locking pins are in engagement with the holes 144 and 146 the bin is tilted to the dumping position. As the bin is tilted over the upper doors 136 and 138 automatically pivot open for dumping the contents out on the ground or if trash is being hauled in it, on a trash pile.

While a preferred embodiment of the invention has been described using specific terms, such description is for illustrative purposes only, and it is to be understood that changes and variations may be made without departing from the spirit or scope of the following claims.

What is claimed is:

1. A lifting device for a truck for lifting objects loaded on a platform from the ground and the like onto the bed of the truck while maintaining said platform parallel to the ground during the lifting operation, said lifting mechanism comprising:

a frame member adapted to be supported over the bed of said truck, a pair of laterally spaced booms having lower ends thereof pivotally supported on said frame member, elongated rigid lifting arms pivotally connected to remote ends of said spaced booms, means for pivotally connecting the free ends of said lifting arms to said platform, power means for rotating said laterally spaced booms for lifting said platform from said ground onto the bed of said truck, abutment means for engaging said elongated rigid lifting arms as said booms are rotated over the bed of said truck for shortening the radius of the arcuate path of travel of said platform as said load is loaded onto said truck bed and said abutment means causing said elongated rigid lifting arms to be pivoted to a position along side of said boom when said boom is rotated to a position substantially parallel to said truck bed.

2. The lifting device as set forth in claim 1 wherein said abutment means is at least one laterally extending post carried by one of said booms.

3. The lifting device as set forth in claim 1 wherein said lower ends of said booms are attached to pulley wheels, said pulley wheels being rotatably supported on said frame and wherein said power means includes hydraulic means for rotating said pulley wheels for raising and lowering said boom.

4. The lifting device as set forth in claim 3 wherein said hydraulic means includes;

a hydraulic cylinder, a movable pulley assembly operatively connected to said hydraulic cylinder for being selectively shifted in opposite directions by selectively activating said hydraulic cylinder, cables extending between said pulley wheels and said pulley assembly for rotating said pulley wheels for raising and lowering said booms responsive to activating said hydraulic cylinder.

5. A lifting device for use on pickup trucks and the like for loading and unloading objects carried on a load support to and from the truck bed, said lifting device coomprising:

a frame member adapted to be supported on the bed of said truck, a pair of laterally spaced booms having lower ends pivotally supported on said frame member on opposite sides of said truck bed, elongated rigid lifting arms each having one end pivotally attached to a respective outer end of one of said booms, means for connecting the free ends of said elongated lifting arms to said load support, cables connected to said booms, hydraulically operated power means connected to said cables for manipulating said cables for raising and lowering said booms, and abutment means for engaging said elongated rigid lifting arms as said booms are rotated over the bed of said truck for shortening the radius of the arcuate path of travel of said platform as said load is loaded onto said truck bed, locking means for fixing said container to at least one of said booms so that said container is tilted to a dumping position as said booms are rotated rearwardly for dumping the contents therefrom.

6. In combination a lifting device for loading and unloading a container to and from a bed of a vehicle and for tilting said container for dumping the contents therefrom, said lifting device comprising:

a frame member adapted to be supported by said vehicle;

a pair of laterally spaced booms having lower ends thereof pivotally supported on said frame member;

rigid elongated lifting arms pivotally connected to remote ends of spaced booms;

means for pivotally connecting the free ends of said rigid lifting arms to said container;

power means for selectively rotating said booms for loading and unloading said container to and from said vehicle;

abutment means for engaging said elongated lifting arms as said booms are rotated over the bed of said vehicle for shortening the radius of the arcuate path of travel of said container as said container is loaded into said bed of said vehicle, and locking means for fixing said container to at least one of said booms so that said container is tilted to a dumping position as said booms are rotated rearwardly for dumping the contents therefrom.

7. The combination as set forth in claim 6 wherein at least one of said boom has a bore extending therethrough said locking means including a slideable bolt carried on said container for being inserted in said bore for fixing said container to said boom.

* * * * *